US005125234A

United States Patent [19]

Yonezawa et al.

[11] Patent Number: 5,125,234

[45] Date of Patent: Jun. 30, 1992

[54] HYDRAULIC CYLINDER APPARATUS OF THE TYPE ACTUATED BY BOOSTER

[75] Inventors: Keitaro Yonezawa, Kobe; Kouichi Kojyo, Yamatokouriyama, both of Japan

[73] Assignees: Kabushiki Kaisha Kosmek, Kobe; Mori Seiki Co., Ltd., Yamatokouriyama, both of Japan

[21] Appl. No.: 691,300

[22] Filed: Apr. 25, 1991

[30] Foreign Application Priority Data

May 11, 1990 [JP] Japan ............ 2-122714

[51] Int. Cl.$^5$ ............ B60T 13/58

[52] U.S. Cl. ............ 60/563; 60/567; 60/581; 60/583; 92/130 B

[58] Field of Search ............ 60/563, 567, 581, 583, 60/584; 92/130 B

[56] References Cited

U.S. PATENT DOCUMENTS 1,230,486 6/1917 Jacomini ............ 60/567
2,075,235 3/1937 Sciaky ............ 60/584
3,426,530 10/1967 Georgelin ............ 60/567
4,103,864 8/1978 Hagendorn ............ 92/130
4,601,457 7/1986 Austin et al. ............ 92/63
4,702,013 2/1978 Barbareschi ............ 60/583

FOREIGN PATENT DOCUMENTS 62-282808 12/1987 Japan .

*Primary Examiner*—Edward K. Look
*Assistant Examiner*—F. Daniel Lopez
*Attorney, Agent, or Firm*—Lowe, Price, Le Blanc & Becker

[57] ABSTRACT

In a hydraulic cylinder apparatus of a type actuated by a booster, a plunger chamber (39) of a booster (32) is connected in communication with an extension cylinder chamber (35) of a hydraulic cylinder (30). An annular oil make-up chamber (48) is disposed outside an outer peripheral surface of the cylinder chamber (35). The oil make-up chamber (48) is connected in communication with the plunger chamber (39) and an electromagnetically opened and closed type shutoff valve (49) is interposed between both said chambers (39) (48).

9 Claims, 11 Drawing Sheets

HYDRAULIC CYLINDER APPARATUS OF THE TYPE ACTUATED BY BOOSTER

BACKGROUND OF THE INVENTION

1. Field of the Invention

The present invention relates to a hydraulic cylinder apparatus of a type in which a hydraulic cylinder is actuated for extension by an oil pressure produced in an intensifier such as a pneumatic/hydraulic booster.

2. Description of Prior Art

A known hydraulic cylinder apparatus of the type actuated by a booster is disclosed in the Japanese Patent Laid Open Publication No. 1987-282808. This hydraulic cylinder apparatus was previously proposed by one of the assignees of the present invention and constructed as illustrated in a schematic view in FIG. 12.

As illustrated in a vertical sectional front view in FIG. 12(*a*) and in a plan view in FIG. 12(*b*), a pneumatic/hydraulic booster 232 is horizontally disposed in a space above a hydraulic cylinder 230 disposed vertically, and an oil make-up tank 247 of the type pneumatically pressurized is disposed in a lateral space beside the hydraulic cylinder. A plunger chamber 239 of the booster 232 is connected in communication with an extension cylinder chamber 235 of the hydraulic cylinder 230 through a pressurized oil supply/discharge piping 290, and an oil make-up chamber 248 of the tank 247 is connected in communication with the plunger chamber 239 through an oil make-up piping 291.

There are, however, the following problems associated with the above prior art.

Since both the left and right end portions of the booster 232 project outwardly beyond the external peripheral surface of the hydraulic cylinder 230, the hydraulic cylinder apparatus 226 has a large outer diameter dimension M.

Further, since there are provided two pipings, namely the pressurized oil supply/discharge piping 290 and the oil make-up piping 291, the length of the piping line becomes long, increasing the air stagnation capacity within the piping line, but also the number of pipe fittings becomes large and increases the air stagnation capacity at stepped portions within the pipe fittings. Therefore, it becomes difficult to remove air working at the time of trial operation of the hydraulic cylinder apparatus 226 and at the time of starting its utilization after the completion of overhaul/maintenance.

For solving the above-mentioned problems, the inventors of the present invention proposed the hydraulic cylinder apparatus 126 illustrated in FIG. 11 prior to the proposal of the present invention.

In this apparatus 126, a booster 132 is disposed in such a manner that a plunger chamber 139 faces downward, and a lower end wall 140 of the plunger chamber 139 is fixedly secured to an upper wall 137 of cylinder chamber 135 of a hydraulic cylinder 130. An oil make-up chamber 148 is disposed in such an annular manner as to encircle the outer periphery of the plunger chamber 139.

The hydraulic cylinder apparatus 126 according to this prior invention example has the following advantages.

An outer diametral dimension of the hydraulic cylinder apparatus 126 can be defined within an outer diametral dimension "d" of the booster 132. When being compared with the dimensions of the conventional embodiment illustrated in FIG. 12, although a height dimension "H" thereof is approximately 3/2 times, an outer diametral dimension thereof can be approximately ½ times. Therefore, the space occupied by it can be made smaller, e.g., about 3/8ths as much.

Further, since the plunger chamber 139 and the cylinder chamber 135 are vertically connected in communication to each other, the pressurized oil supply/discharge piping 290 of the conventional embodiment can be omitted. Since the piping line can be shortened, the number of the pipe fittings can be decreased correspondingly and removal of air from the apparatus becomes easy.

Some room for improvement remains in making the hydraulic cylinder apparatus 126 small, which might be attained by decreasing the height dimension "H" thereof.

SUMMARY OF THE INVENTION

It is a principal object of the invention to provide a hydraulic cylinder apparatus of small size.

For accomplishing the aforementioned object, a hydraulic cylinder apparatus according to the present invention is constructed as follows: a plunger chamber of a booster is directly connected in series to an extension cylinder chamber of a hydraulic cylinder. An annular oil make-up chamber is disposed outside an outer peripheral surface of the cylinder chamber. The oil make-up chamber is connected to the plunger chamber through a plunger pressure shutoff valve.

According to a preferred embodiment of the present invention, since the pressurized oil supply/discharge piping 290 employed in the conventional embodiment (refer to FIG. 12) can be omitted, oil leakage caused by loosening of the piping fittings, which might be caused by an expansion and contraction thereof at the time of pressurized oil supply/discharge, can be decreased. Accordingly, the oil make-up chamber can be manufactured in a small capacity by that amount. As a result, an outer diametral dimension of the outer peripheral wall of the oil make-up chamber can be small, and an outer diametral dimension of the hydraulic cylinder apparatus can be made approximately ½ times as large as that of the conventional apparatus.

Further, since both a lower end wall 140 of the plunger chamber 139 and an upper end wall 137 of the cylinder chamber 135 employed in the prior invention example (refer to FIG. 11) can be omitted by directly connecting the plunger chamber to the cylinder chamber in series, the height dimension of the hydraulic cylinder apparatus can be lowered by a total amount corresponding to the wall thicknesses of both the walls 140, 137.

Therefore, the the hydraulic cylinder apparatus of the present invention can be restrained from becoming tall while being made smaller in diametral dimension and can be manufactured to be generally smaller. Further, the hydraulic cylinder apparatus can be decreased in weight correspondingly to the total thicknesses of both the aforementioned walls 140, 137.

BRIEF DESCRIPTION OF THE DRAWINGS

The above and other objects, advantages and features of the invention will become apparent when considered with the following description and accompanying drawings wherein:

FIG. 1 is a vertical sectional front view of a hydraulic cylinder apparatus;

FIG. 2 is a front view of a machining center equipped with said the hydraulic cylinder apparatus;

FIG. 3 is a sectional view taken along the III—III directed line in FIG. 2;

FIG. 4 is a schematic view corresponding to FIG. 3;

FIG. 5 is a circuit diagram of said hydraulic cylinder apparatus;

FIG. 6 is an enlarged view of the portion indicated by the arrow A in FIG. 1;

FIG. 7 is an explanatory view of an operation of said hydraulic cylinder apparatus, FIG. 7(*a*) is a schematic view showing it in a contracted condition, and FIG. 7(*b*) is a schematic view showing an extended condition;

FIGS. 8(*a*) and 8(*b*) are schematic views of said hydraulic cylinder apparatus, FIG. 8(*a*) is a vertical sectional front view, and FIG. 8(*b*) is a plan view;

DESCRIPTION OF THE PREFERRED EMBODIMENTS

The preferred embodiment of the present invention will now be explained with reference to FIG. 1 through FIG. 8.

Figure 2:
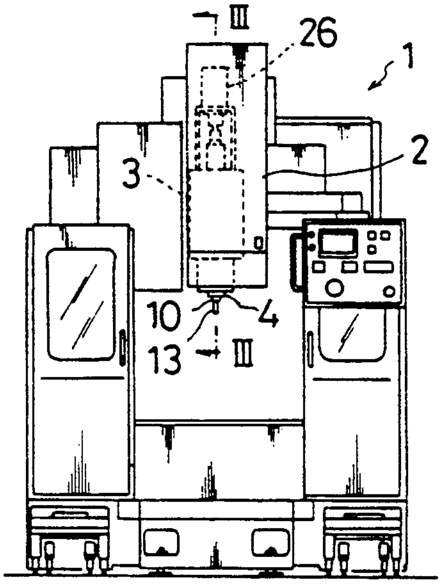

Firstly referring to FIG. 2 through FIG. 4, there will be explained an overall construction of a tool mounting-/dismounting device for a machining center, to which the hydraulic cylinder apparatus of the present invention is applied.

A spindle 4 is disposed within a casing 3 fixedly secured to a spindle head 2 of a vertical machining center 1, The spindle 4 is rotatably supported by means of a plurality of bearings 5 so as to be rotated at a high speed by means of a motor 6. A drawbar 8 is vertically slidably inserted into the spindle 4, and a collet 9 is connected to the lower portion of the drawbar 8.

When a tool holder 10 is clamped to the spindle 4, the drawbar 8 is resiliently urged upward with respect to the spindle 4 by means of a clamping spring 11 and collet 9 is contracted in diameter and is raised, so that the tool holder 10 is fixedly pushed onto a holder-receiving surface 4*a* of the lower portion of the spindle 4 through a pull bolt 12.

Further, even when a pulling down force larger than a resilient force of the clamping spring 11 is imposed to a tool 13 during a machining of a work, there is provided a device for holding the drawbar 8 in a clamped condition. This clamped condition holding device 15 comprises a cylinder 16 fixedly secured to the upper portion of the spindle 4 and a piston 17 inserted vertically slidably and liquid-tightly into the cylinder 16. The piston 17 is fixedly secured to the upper portion of the drawbar 8. A liquid sealing chamber 18 for producing a back pressure is formed below the piston 17, and a liquid supply/discharge chamber 19 is formed above the piston 17. A check valve 21 is provided in a communication passage 20 between both these chambers 18, 19.

Figure 4:
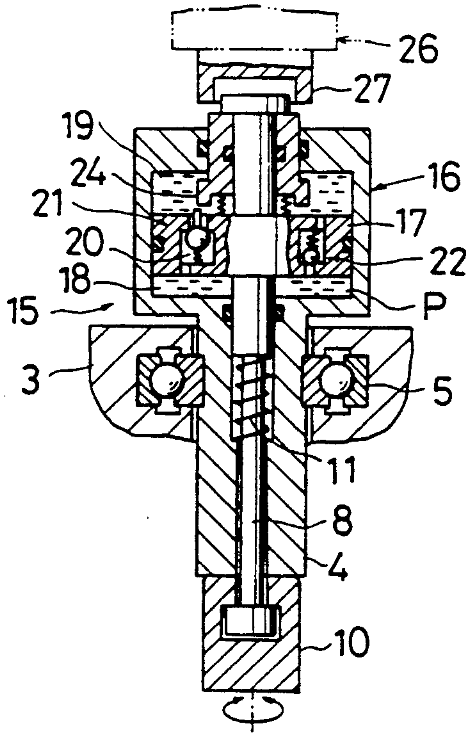

Then, under the clamped condition as illustrated in FIG. 4, the check valve 21 is closed so that an oil P is sealed within the liquid sealing chamber 18. In the case that the pulling down force larger than the resilient force of the clamping spring 11 is imposed to the drawbar 8, a pressure of the oil P within the liquid sealing chamber is increased against the pulling down force so as to prevent lowering of both the piston 17 and the drawbar 8. Thereby, the drawbar 8 can be held at its clamped position so as to hold the tool holder 10 in the clamped condition. Incidentally, in case an abnormal pressure is produced within the liquid sealing chamber 18, by an increase in temperature or the like, a relief valve 22 is provided to operate for safety.

At the time of unclamping of the tool holder 10, a hydraulic cylinder apparatus 26 disposed above the spindle 4 is actuated for extension so as to lower an unclamping input member 24 within the cylinder 16 by means of its output portion 27. Thereupon, the input member 24 serves first to open the check valve 21 so as to eliminate the pressure of the oil P within the liquid sealing chamber 18, and subsequently the piston 17 and the drawbar 8 are actuated for lowering against the clamping spring 11 so that the collet 9 is expanded in diameter and is lowered to allow the tool holder 10 to be pulled out.

Figure 3:
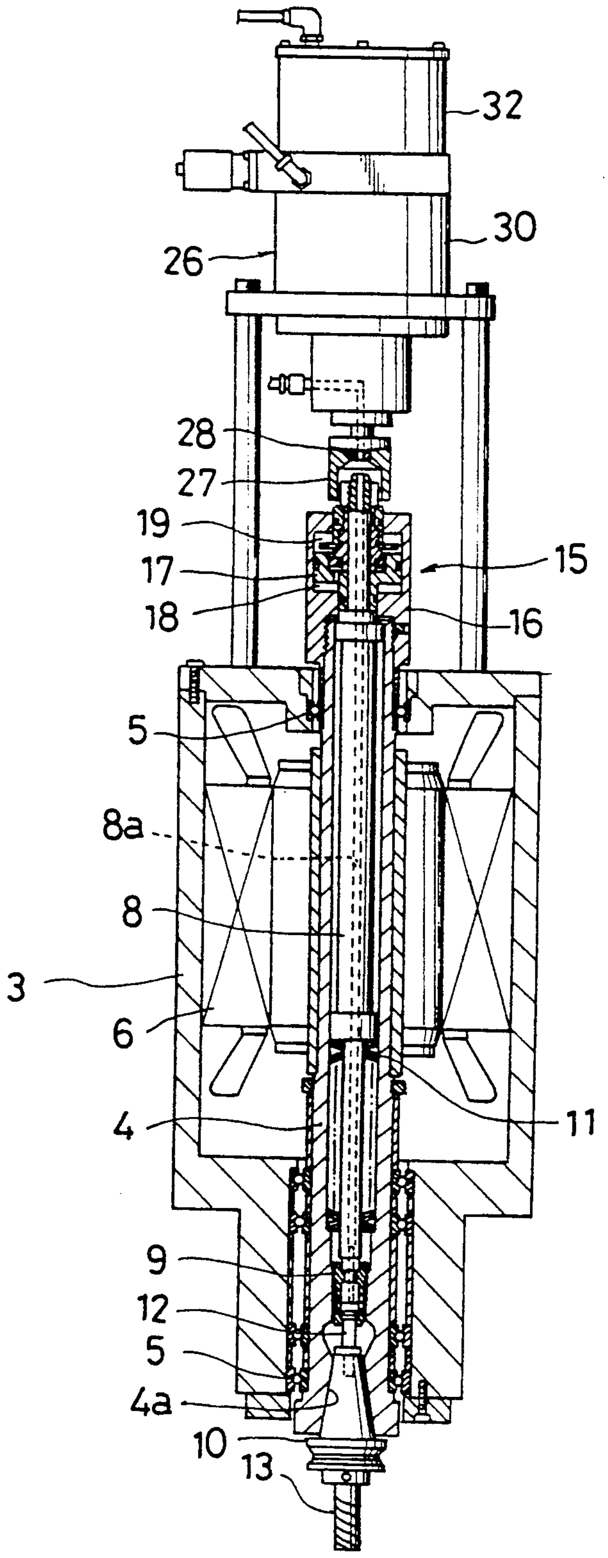

Incidentally, as illustrated in FIG. 3, an air-blow flow passage 8*a* is formed as a through-hole in the drawbar 8, and an upper end of the flow passage 8*a* is adapted to be connected in communication to an air supply port 28 formed in the output portion 27 of the hydraulic cylinder apparatus 26.

The aforementioned hydraulic cylinder apparatus 26 is adapted to extend the hydraulic cylinder 30 by means of a delivery pressure of a cam pump 31 (refer to FIG. 5) internally provided in the machining center 1 or by means of a delivery pressure of a pneumatic/hydraulic booster 32. A construction of the hydraulic cylinder apparatus 26 will be explained with reference to FIG. 1 and FIG. 5 through FIG. 7 hereinafter.

Figure 5:
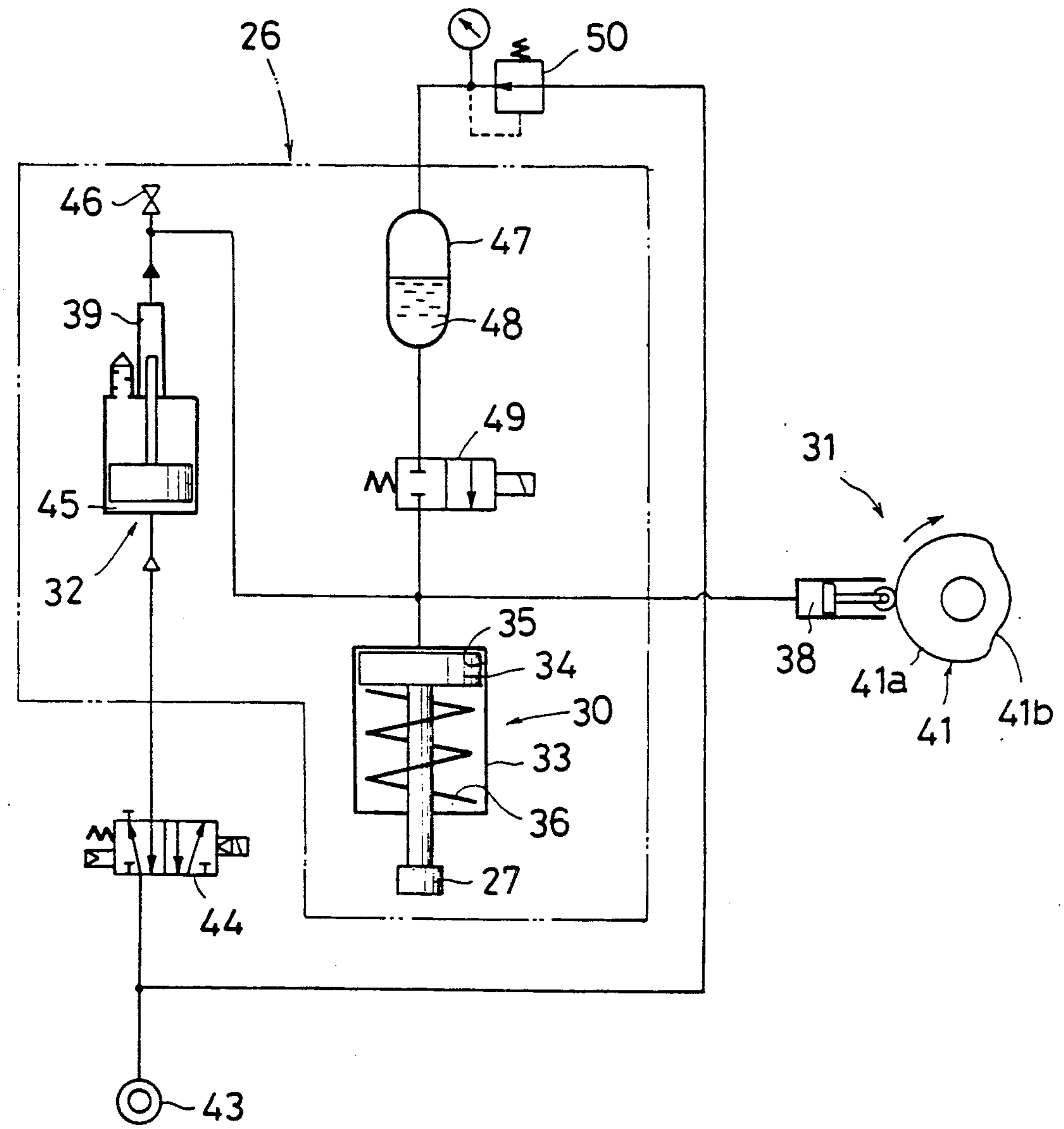

The circuit diagram of FIG. 5 will be schematically explained.

The hydraulic cylinder 30 is of the type returned by a single-acting spring and comprises a cylinder chamber 35 for providing an extension formed above the piston 34 within the cylinder 33, and a return spring 36 is installed below the piston 34. A pump chamber 38 of the cam pump (hydraulic pump) 31 and a plunger chamber 39 of the pneumatic/hydraulic booster 32 are connected in communication to the cylinder chamber 35.

The cam pump 31 serves to unclamp the tool holder 10 (refer to FIG. 3) by interlockingly operating with an automatic tool replacing device of the machining center 1 (refer to FIG. 2) so as to extend the hydraulic cylinder 30. That is, a pressurized oil is supplied from the pump chamber 38 to the cylinder chamber 35 of the hydraulic cylinder 30 by means of a pushing force of an advancement actuating portion 41*a* of the cam 41 which is adapted to be rotated in agreement with a removal timing of the tool holder 10. Thereby, the hydraulic cylinder 30 is extended, so that the aforementioned output portion 27 is lowered. Then, when the cam 41 of the cam pump 31 takes a rotation position of its retreat receiving portion 41*b*, the hydraulic cylinder 30 is contracted by means of a resilient force of the return spring 36 so that the oil within the cylinder chamber 35 is returned to the pump chamber 38. Incidentally, an oil delivery quantity of the cam pump 31 is set at a value larger than an oil quantity required for extending the piston 34 to take into consideration the compressibility of the oil, mixing of air, expansion of hydraulic hoses resilient deformation of a cylinder barrel 55 of the hydraulic cylinder 30 (refer to FIG. 1), a compression deformation of a sealing member, and the like.

The booster 32 serves to perform an unclamping actuation for the tool holder 10 by extending the hydraulic cylinder 30 by means of a manipulation to be carried out during a stoppage of the tool automatic replacing device of the machining center 1. That is, by supplying pressurized air from a pneumatic source 43 to a pneumatic actuating chamber 45 of the booster 32 through a supply/discharge changeover valve 44, pressurized oil is supplied from the plunger chamber 39 to the cylinder chamber 35 so as to extend the hydraulic cylinder 30. The symbol 46 designates an air removing valve. Incidentally, a contraction of the hydraulic cylinder 30 is performed by discharging the pressurized air within the pneumatic actuating chamber 45 from the supply/discharge changeover valve 44.

An oil make-up chamber 48 defined within an oil make-up tank 47 is connected in communication to both the pump chamber 38 and the plunger chamber 39 through a plunger pressure shutoff valve 49 of the type electromagnetically opened and closed. The pressurized air is always supplied from the pneumatic source 43 to the upper portion of the oil make-up chamber 48 through a pressure reduction valve 50. The shutoff valve 49 is adapted to be actuated for valve closing during its oil delivery stroke of the cam pump 31 or of the booster 32 and is actuated for valve opening after the completion of its oil sucking back stroke so as to supplementally supply the oil from the oil make-up chamber 48 to the pump chamber 38 or to the plunger chamber 39.

Next, a concrete construction of the hydraulic cylinder apparatus 26 will be explained with reference to FIG. 1 and FIG. 6 through FIG. 8.

Figure 8B:
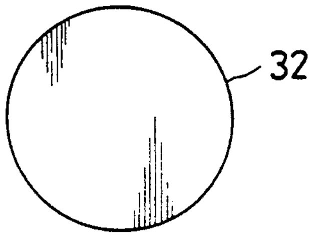
Figure 8A:
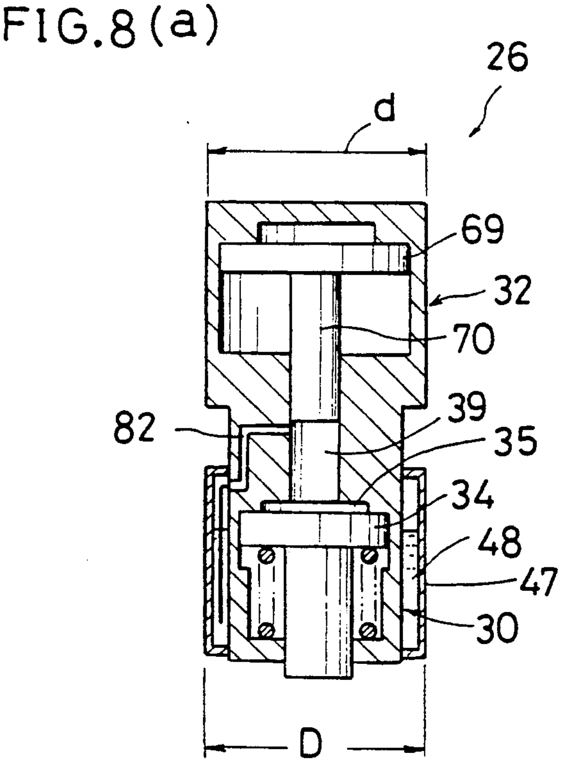

As illustrated in a schematic view of FIG. 8, the booster 32 is located above the hydraulic cylinder 30 and disposed in series and coaxially with respect to the hydraulic cylinder 30. Further, the plunger chamber 39 of the booster 32 is directly connected in communication to the cylinder chamber 35 of the hydraulic cylinder 30. The oil make-up chamber 48 is formed in an annular configuration and located outside the outer periphery of the cylinder chamber 35.

Figure 1:
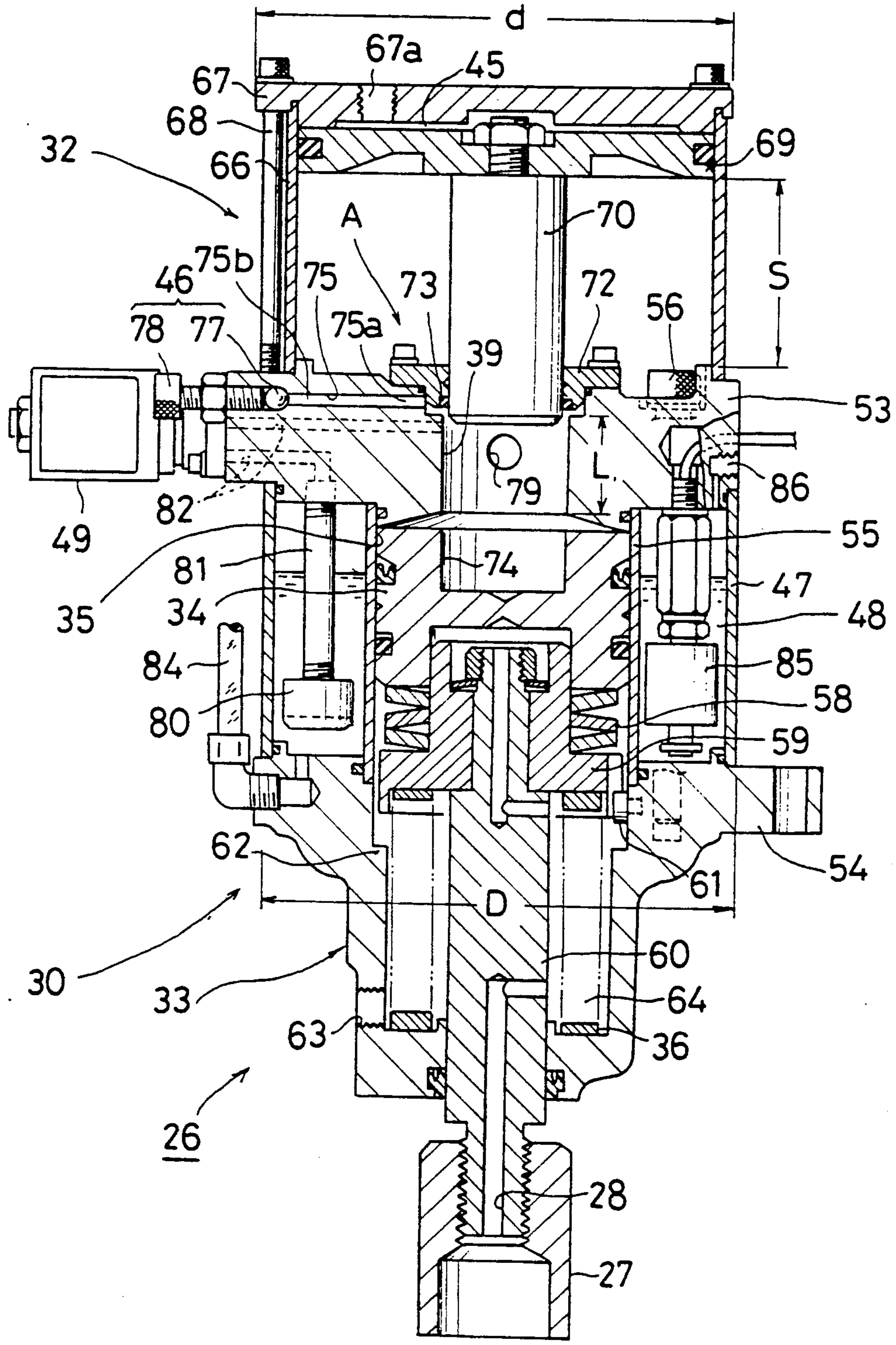
FIG. 1 through FIG. 8 illustrate a preferred embodiment of the present invention.

That is, as illustrated in FIG. 1, the cylinder 33 of the hydraulic cylinder 30 comprises a cylinder barrel 55 which is oil-tightly fixed between an upper block 53 and a lower block 54 by means of a plurality of tie-rods 56. The aforementioned piston 34 is vertically slidably and oil-tightly inserted into the cylinder barrel 55. The piston 34 has a H-shaped vertical section, and the cylinder chamber 35 is formed above the piston 34. The lower portion of the piston 34 is connected to the aforementioned output portion 27 through three coned disc spring 58, an intermediate transmission member 59 and a pushing rod 60, in order.

The intermediate transmission member 59 is so guided as to be linearly movable vertically by means of a linearly guiding pin 61 provided in the lower block 54 and is upwardly resiliently urged by means of the aforementioned return spring 36. It is prevented by means of a reduced diameter shoulder portion 62 of the lower block 54 from lowering more than a predetermined distance. Blowing air supply port 63 formed in the lower block 54 is connected in communication to the aforementioned air supply port 28 of the pushing rod 60 through a spring accommodation chamber 64.

Further, the oil make-up tank 47 is oil-tightly fixed between the upper and lower blocks 53, 54, to be surrounding the cylinder barrel 55. Between oil make-up tank 47 and the cylinder barrel 55 there is provided the aforementioned oil make-up chamber 48 having an annular room.

The booster 32 comprises a cylinder barrel 66 which is air-tightly fixed between the upper surface of the upper block 53 and an upper end wall 67 by means of a plurality of tie-rods 68. The outer diametral dimension "d" of the upper end wall 67 is set at the substantially same value as the outer diametral dimension "D" of the oil make-up tank 47 forming the outer peripheral wall of the oil make-up chamber 48. The pneumatic actuation chamber 45 is formed above a pneumatic piston 69 which is vertically slidably and air-tightly inserted into the cylinder barrel 66. A pressurized air supply/discharge port **67*a* is formed in the upper end wall 67. A plunger 70 is projected downwardly from the pneumatic piston 69. This plunger 70 is vertically slidably and oil-tightly supported by the upper block 53 through a ground member 72 and a packing 73. An allowed stroke "S" of the plunger 70 is selected to have a magnitude larger than length "L" of the plunger chamber 39 which is formed in the upper block 53. Further, a plunger receiving hole 74 is concavely formed in the upper end surface of the hydraulic piston 34**.

A first end **75*a* of an air-removing port 75 is opened in the upper end portion of the plunger chamber 39. In a second end 75*b* of the air-removing port 75 there are provided the aforementioned air-removing valve 46 comprising a ball valve member 77 and a pushing bolt 78. A pressure introduction inlet 79 adapted to be connected in communication to the pump chamber 38 of the cam pump 31 is opened in the upper portion of the plunger chamber 39**.

Further, the lower space of the oil make-up chamber 48 and the upper space of the plunger chamber 39 are connected in communication to each other through a filter unit 80, an oil make-up pipe 81 and an oil make-up passage 82 formed in the peripheral wall of the plunger chamber 39 in order. In the midway portion of the oil make-up passage 82 there is provided the aforementioned shutoff valve 49.

An oil level position within the oil make-up chamber 48 is adapted to be visually confirmed by means of a sight gauge 84 the upper and lower ends of which are connected in communication to the oil make-up chamber 48. In case the oil level descends below the lower limit position, an oil level detection switch 85 of the float switch type is adapted to output an oil level descent signal. A pressurized air supply port 86 is connected in communication to the upper space of the oil make-up chamber 48. An oil supply into the oil make-up chamber 48 is carried out after removal of a plug 87 shown in FIG. 7(*a*).

Figure 6:
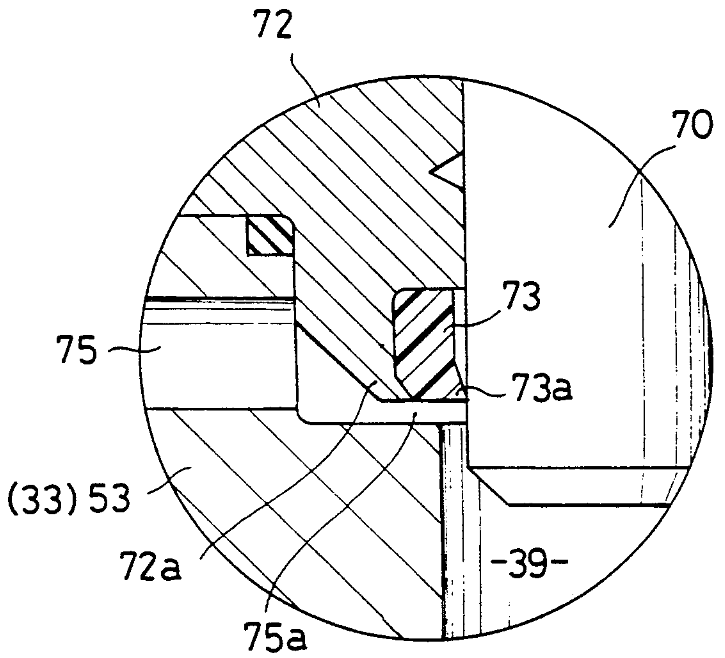

Incidentally, as illustrated in FIG. 6, the first end **75*a* of the air removing port 75 has such a construction as to prevent an air stagnation. That is, the air-removing port first end 75*a* is formed in an upwardly inclined manner as it extends radially outwardly from the plunger chamber 39. Further, the lower end portion 73*a* of the packing 73 is kept into sealing contact with the plunger 70 by means of the lower end portion 72*a* of the ground member 72. Thereby, in the case of this packing 73**, air stagnation in the space below the packing installation location is prevented differently from the case of an installation of a U-packing.

Operation of the above-mentioned hydraulic cylinder apparatus 26 will be explained with reference to FIG. 7.

Figure 7B:
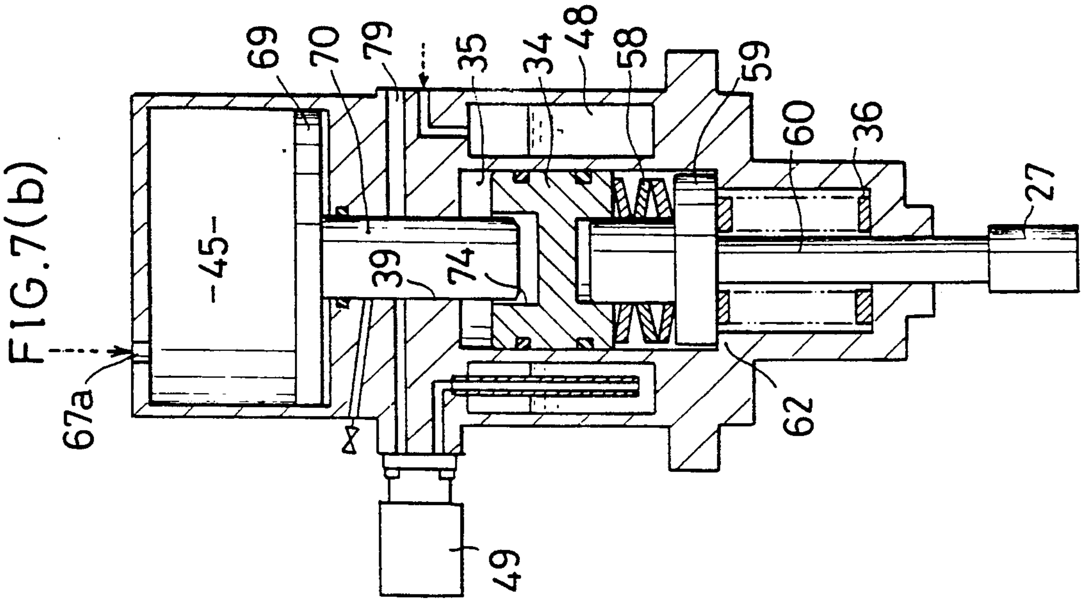
Figure 7A:
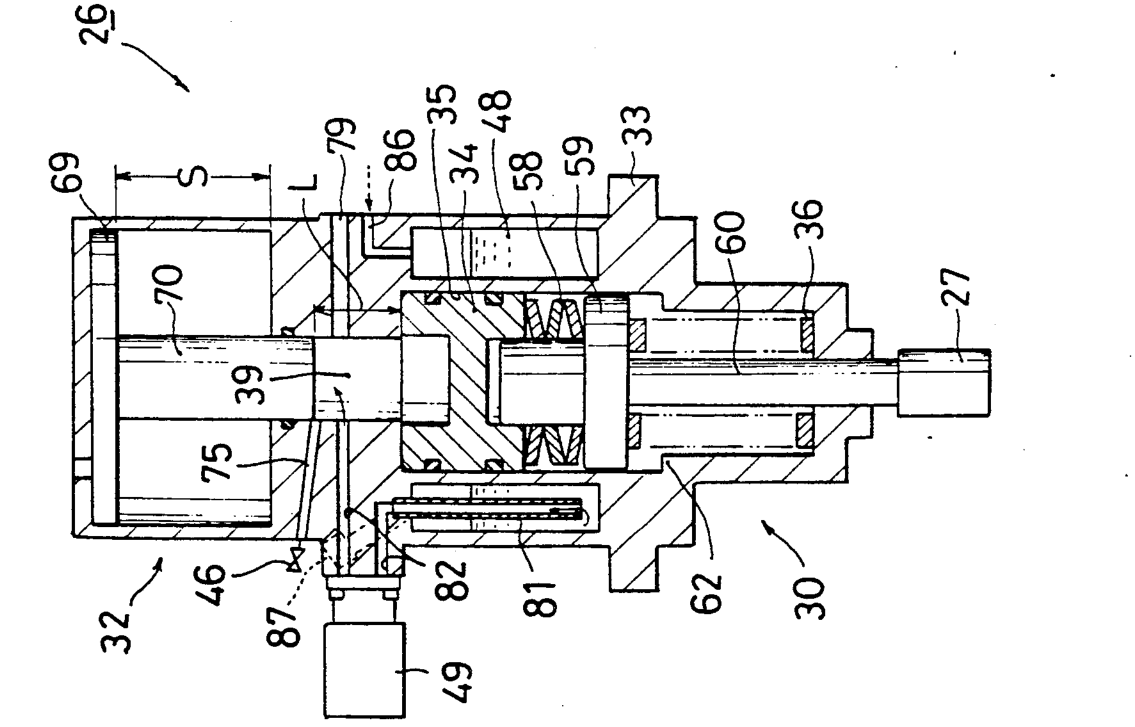

In the condition illustrated in FIG. 7(*a*), the operations of both the cam pump 31 (refer to FIG. 5) and the booster 32 are stopped, and the hydraulic cylinder 30 is changed over to its contracted condition.

Under this condition, the shutoff valve 49 is opened and the oil within the oil make-up chamber 48 is supplied under pressure from the oil make-up pipe 81 to the plunger chamber 39 and the cylinder chamber 35 through the oil make-up passage 82 by means of a pneumatic pressure (herein, ab. 2 $Kgf/cm^2$) in the pressurized air supply port 86 so as to push up the pneumatic piston 69 of the booster 32 to its top dead center position. Further, the piston 34 of the hydraulic cylinder 30 is raised and returned to its top dead center position by means of the resilient force of the return spring 36 overcoming an application pressure of the aforementioned pressurized air.

At the time of trail operation of the hydraulic cylinder apparatus 26, or at the time of starting the utilization after the completion of overhaul maintenance, by repeating the opening and closing of the air removing valve 46 under the condition illustrated in FIG. 7(*a*) any air within the oil make-up passage 82, the plunger chamber 39, and the air removing port 75 is discharged to the outside.

When hydraulic cylinder 30 is intended to be extended by a manual operation, the shutoff valve 49 is first closed and then, as illustrated in FIG. 7(*b*), pressurized air (at about 5 $Kgf/cm^2$) is supplied to the supply/discharge port 67*a* of the booster 32 so as to lower the plunger 70 toward its bottom dead center by means of the pneumatic piston 69. Thereupon, the leading end portion of the plunger 70 plunges into the cylinder chamber 35 and subsequently plunges into also the receiving hole 74 of the piston 34 so as to increase the pressure within the cylinder chamber 35 to an extent corresponding to a cross-sectional area ratio between the pneumatic piston 69 and the plunger 70. Following that, the piston 34 lowers the output portion 27 against the return spring 36 through the coned disc springs 58, the intermediate transmission member 59 and the pushing rod 60 in order.

When the extended condition illustrated in FIG. 7(*b*) is intended to be changed over to the contracted condition illustrated in FIG. 7(*a*), the pressurized air is discharged from the supply/discharge port 67*a* of the booster 32. Thereupon, the piston 34 is raised and returned to its top dead center position by means of the resilient force of the return spring 36 to increase the pressure within the cylinder chamber 35, and the pneumatic piston 69 is raised and returned to its top dead center position by means of that increased pressure through the plunger 70. After that, when the shutoff valve 49 is opened, the oil within the oil make-up chamber 48 is supplementally supplied to the plunger chamber 39 by means of the application force of the pressurized air within the oil make-up chamber 48 through the oil make-up passage 82 as indicated by the allow in FIG. 7(*a*).

Further, the hydraulic cylinder 30 is automatically extended and contracted by means of the cam pump 31 (refer to FIG. 5). That is, under the contracted condition illustrated in FIG. 7(*a*), when the pressurized oil is supplied from the pressure introduction inlet 79 into the cylinder chamber 35 through the plunger chamber 39 during the delivery process of the cam pump 31, the piston 34 is lowered and the intermediate transmission member 59 is received by the reduced diameter shoulder portion 62. Incidentally, a margin delivery quantity of the cam pump 31 is adapted to be absorbed by compression deformations of the plurality of coned disc springs 58 caused by the piston 34. By contrast, during the suction back stroke of the cam pump 31, the piston 34 is raised and returned to its top dead center position by means of the return spring 36 as and the oil within the cylinder chamber 35 is returned from the plunger chamber 39 to the pump chamber 38 of the cam pump 31. Incidentally, the aforementioned shutoff valve 49 is so controlled as to be closed during the delivery stroke of the cam pump 31 and is opened after the completion of the suction back stroke.

FIG. 8 is a schematic view corresponding to FIG. 1 and illustrates a condition in which the outer diametral dimension "d" of the booster 32 is enlarged to a value substantially equal to the outer diametral dimension "D" of the oil make-up tank 47 and the oil make-up passage 82 between the cylinder chamber 35 and the oil make-up chamber 48 is formed in the peripheral wall of the plunger chamber 39.

Figure 9B:
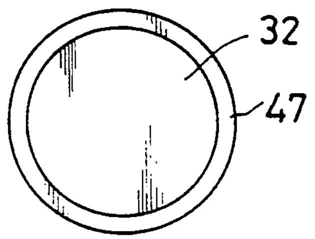
FIGS. 9(*a*) and 9(*b*) illustrate a variant of the hydraulic cylinder apparatus and is a view corresponding to FIG. 8.
Figure 9A:
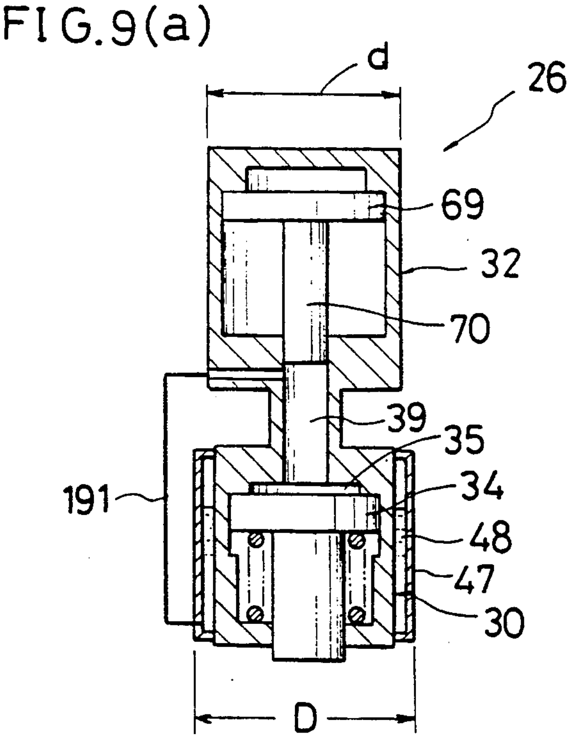
Figure 11B:
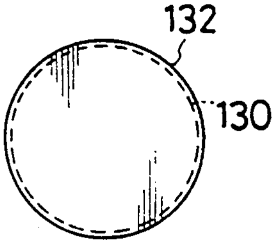
FIGS. 11(*a*) and 11(*b*) illustrate a prior invention example of a hydraulic cylinder apparatus and is a view corresponding to FIG. 8.
Figure 11A:
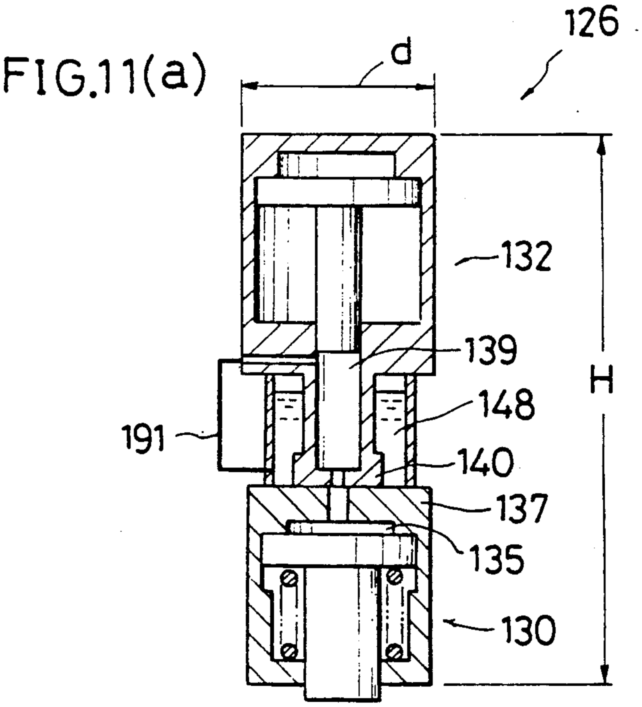

Further, FIG. 9 illustrates a variant of the hydraulic cylinder apparatus 26 and is a view corresponding to FIG. 8. Incidentally, in this variant, the component members having the same functions as those shown in FIG. 8 are, in principle, designated by the same symbols. According to this variant, the outer diametral dimension "d" of the booster 32 smaller than the outer diametral dimension "D" of the oil make-up tank 47 and the oil make-up chamber 48 and the plunger chamber 39 are connected in communication to each other by an oil make-up piping 191 similarly to that taught in the prior invention example per FIG. 11.

The hydraulic cylinder apparatus 26 illustrated in FIG. 1 (or FIG. 8) and in FIG. 9 provides the following advantages.

Figure 12B:
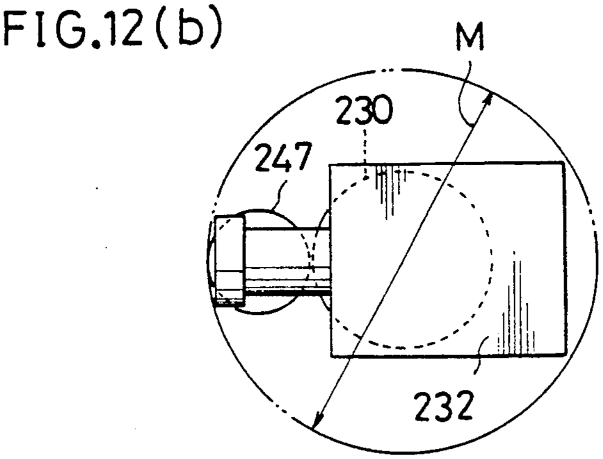
PRIOR ART FIG.12(b)
FIGS. 12(*a*) and 12(*b*) illustrate a conventional apparatus and is a view corresponding to FIG. 8.
Figure 12A:
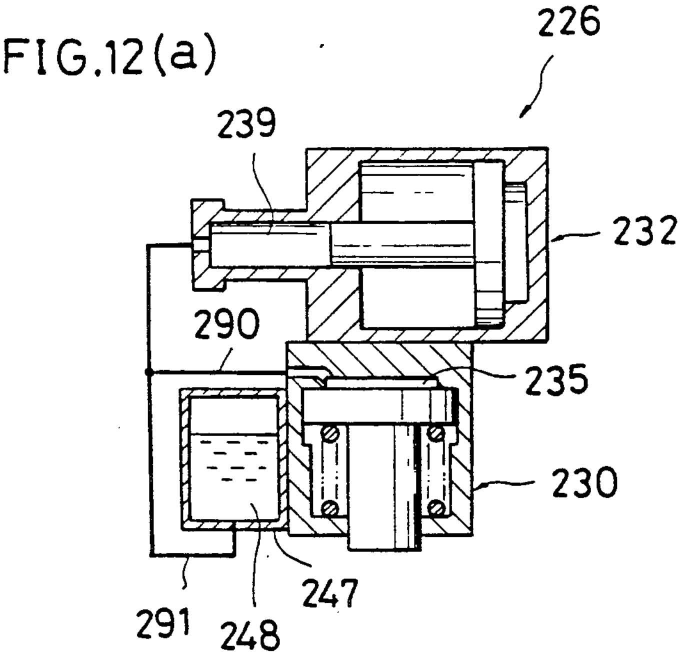

(1) Since the pressurized oil supply/discharge piping 290 employed in the conventional embodiment (refer to FIG. 12) can be omitted in the hydraulic cylinder apparatus 26, oil leakage caused by loosening of the pipe fittings, which might be caused by an expansion and contraction thereof at the time of pressurized oil supply/discharge, can be decreased. Accordingly, the oil make-up chamber 48 can be manufactured to have a small capacity. As a result, the outer diametral dimension "D" of the oil make-up tank 47 can be small as well as the outer diametral dimension of the hydraulic cylinder apparatus 26 can be approximately ½ times as large as that of the conventional apparatus. Further, since both the lower end wall 140 of the plunger chamber 139 and the upper end wall 137 of the cylinder chamber 135 employed in the prior invention example (refer to FIG. 11) can be omitted by directly connecting the plunger chamber 39 to the cylinder chamber 35, the height dimension of the hydraulic cylinder apparatus 26 can be decreased by the total dimesion of the wall thicknesses of both the walls 140, 137. Therefore, the hydraulic cylinder apparatus 26 can be restrained from becoming tall while being made smaller in diametral dimension and hence can be manufactured in a relatively small size entirely.

Further, since the piping line can be shortened and the number of the pipe fittings can be decreased, in accordance with the omitted pressurized oil supply/discharge piping 290 of the conventional structure, the air removing step for the hydraulic cylinder apparatus 26 becomes easy.

The hydraulic cylinder apparatus 26 illustrated in FIG. 1 (or FIG. 8) provides further the following advantages (2) through (7) in comparison with the apparatus of the variant illustrated in FIG. 9.

(2) Since the outer diametral dimension "d" of the booster 32 is enlarged to the value substantially equal to the outer diametral dimension "D" of the oil make-up tank 47, the cross-sectional areas of the pneumatic piston 69 and the plunger 70 can be made larger in comparison with the variant illustrated in FIG. 9. Therefore, the booster 32 permits the pneumatic piston 69 to have a smaller stroke while keeping the pressurized oil delivery quantity to the cylinder chamber 35 at a predetermined value. As a result, the height dimension of the hydraulic cylinder apparatus 26 becomes even lower.

(3) Since the allowed stroke "S" of the plunger 70 is defined in a larger dimension than the length "L" of the plunger chamber 39 while the advancement end portion of the plunger 70 is advanced to its bottom dead center position and is adapted to plunge into the cylinder chamber 35, both the height dimension and the weight of the hydraulic cylinder apparatus 26 can be reduced in correspondence with that plunging distance.

(4) Since the advancement end portion of the plunger 70 advanced to its bottom dead center position is adapted to plunge into the plunger receiving hole 74 of the piston 34, both the height dimension and the weight of the hydraulic cylinder apparatus 26 can be further reduced in correspondence with that plunging distance.

(5) Since the oil make-up passage 82 for connecting the oil make-up chamber 48 and the plunger chamber 39 to each other is formed in the peripheral wall of the plunger chamber 39, all of the connecting pipings, namely both the pressurized oil supply/discharge piping 290 and the oil make-up piping 291 employed in the conventional embodiment (refer to FIG. 12) can be omitted.

Accordingly, since the hydraulic cylinder apparatus 26 will not be affected by the oil leakage from the piping fittings to enable the capacity of the oil make-up chamber 48 to be reduced, it can be manufactured in the smaller diameter. Further, the space occupied by the hydraulic cylinder apparatus 26 becomes smaller in correspondence with that omitted piping space.

Then, since the air stagnations within the pipes and the air stagnations at the stepped portions within the piping fittings can be removed by omissions of the pipings and the piping fittings, air removal for the hydraulic cylinder apparatus 26 becomes easy and erroneous operation of the hydraulic cylinder 30 can be prevented.

Further, the hydraulic cylinder apparatus 26 can provide the following advantages owing to the above-mentioned omissions of the pipings and the piping fittings. That is, since the piping and assembly working can be omitted, it becomes possible to prevent foreign substances such as sealing tape, dusts, rust and the like from entering the apparatus at the time of manufacturing and overhaul maintenance so as to keep well the functions and the service life of the hydraulic cylinder apparatus 26. Since it becomes possible to remove the loosening of the piping fitting, which might be caused by an expansion and contraction thereof at the time of the pressurized oil supply/discharge, intensification re-tightenings during service can be omitted and labor and time for the maintenance can be saved. Since the hydraulic cylinder apparatus 26 enables the omission of the piping working which requires skillfullness, it becomes ready to enhance the quality while the manufacturing cost thereof can be reduced.

(6) Since the hydraulic cylinder apparatus 26 is disposed in a vertical posture so that the first end 75*a* of the air removing port 75 can be opened in the upper end portion of the plunger chamber 39, all the air within the hydraulic cylinder gathers at the upper end portion of the plunger chamber 39. The air gathered there can be discharged readily from the air-removing port 75, so that the air-removing work can be carried out perfectly in a short time.

(7) Since the pressure introduction inlet 79 connected in communication to the hydraulic pump 31 is opened in the plunger chamber 39 of the booster 32 so that the hydraulic cylinder 30 can be operated selectively by means of two actuation devices, namely the booster 32 and the hydraulic pump 31, the way of operating the hydraulic cylinder apparatus 26 is diversified.

The above-mentioned embodiments may be modified as follows.

The hydraulic cylinder 30 may be of the double acting type instead of the single-acting spring-return type. That is, the hydraulic piston 34 may be adapted to be returned by means of a fluid pressure from, for example, pressurized air.

The booster 32 may be actuated by means of other kinds of fluids such as nitrogen gas, oil and the like, besides the pressurized air.

The plunger pressure shutoff valve 49 may be composed of other kinds of stop valves and check valves instead of the electromagnetically opened and closed valve.

Further, the hydraulic cylinder apparatus 26 may be manufactured so as to be disposed horizontally instead of vertically.

Figure 10:
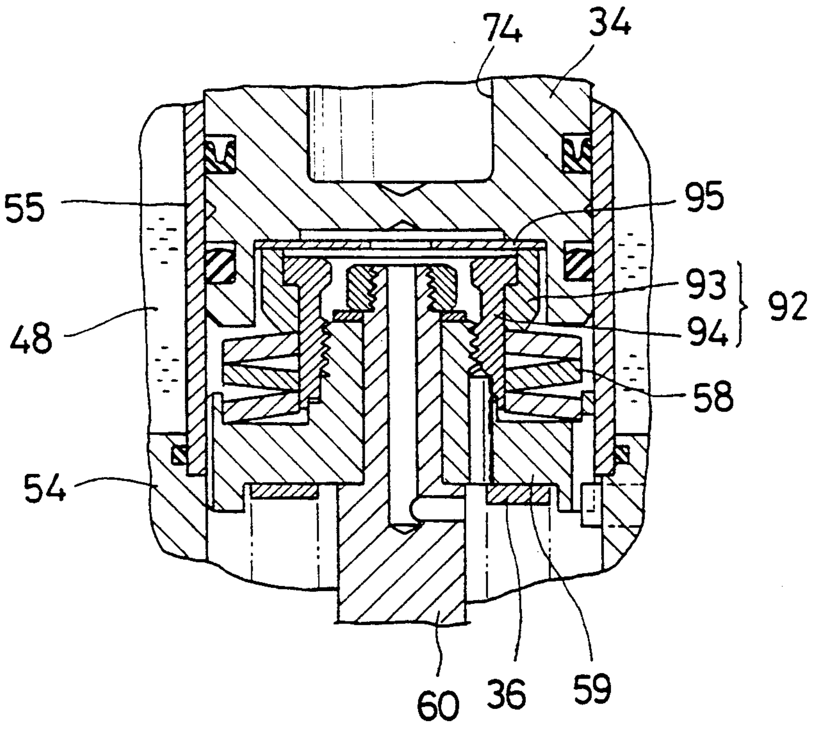
FIG. 10 illustrates a variant of a construction for installing coned disc springs and is a view corresponding to FIG. 1.

FIG. 10 illustrates a variant of the construction for installing the coned disc springs 58. Incidentally, in this variant, the component members having the same construction as illustrated in FIG. 1 are, in principle, designated by the same symbols.

In this case, the plurality of coned disc springs 58 installed between the piston 34 and the intermediate member 59 are preloaded by a pushing means 92. The pushing means 92 comprises a pushing nut 94 threadably secured to the upper portion of the intermediate transmission member 59 and a pushing ring 93 externally fitted to the nut 94. A shim 95 is installed between the ring 93 and the piston 34. Since these coned disc springs 58 are preloaded as mentioned above so as to reduce their stress amplitudes, the service life thereof becomes longer.

Many different embodiments of the present invention will be obvious to those skilled in the art, some of which have been disclosed or referred to herein, hence it is to be understood that the specific embodiments of the invention as presented herein are intended to be by way of illustration only and are not limiting on the invention, and it is to be further understood that such embodiments, changes, or modifications may be made without departing from the spirit and scope of the invention as set forth in the claims appended hereto.

What is claimed is:

1. A hydraulic cylinder apparatus, comprising:

a hydraulic cylinder provided with a cylinder chamber having an outer peripheral surface;

a booster provided with a plunger chamber connected in communication to said cylinder chamber directly and in series;

an annular oil make-up chamber disposed outside the outer peripheral surface of said cylinder chamber;

an oil make-up passage disposed between said oil make-up chamber and said plunger chamber;

a plunger pressure shutoff valve disposed in said oil make-up passage; and an air removing port opened in said plunger chamber at an end portion thereof remote from said cylinder chamber.

2. The hydraulic cylinder apparatus according to claim 1, wherein:

an outer diametral dimension (d) of said booster is substantially equal to an outer diametral dimension (D) of an outer peripheral wall of said oil make-up chamber.

3. The hydraulic cylinder apparatus according to claim 1, wherein:

a plunger is adapted to be inserted into said plunger chamber and has an allowed stroke (S) which is longer than a length (L) of said plunger chamber; and a leading end portion of the plunger, in being advanced to its bottom dead center position, is disposed to plunge into said cylinder chamber.

4. The hydraulic cylinder apparatus according to claim 3, wherein:

a plunger receiving hole is concavely formed in a first end surface, facing said plunger chamber, of a piston inserted into said cylinder chamber; and a leading end portion of the plunger, in being advanced to its bottom dead center position, is disposed to plunge into said plunger receiving hole.

5. The hydraulic cylinder apparatus according to claim 1, wherein:

said oil make-up passage is formed in a peripheral wall of said plunger chamber for connecting said oil make-up chamber and said plunger chamber to each other.

6. The hydraulic cylinder apparatus according to claim 1, wherein:

said plunger pressure shut off valve is of a kind that is electromagnetically opened and closed.

7. The hydraulic cylinder apparatus according to claim 1, wherein:

a hydraulic pump having a pump chamber is connected to said hydraulic cylinder in parallel with said booster; and a pressure introduction inlet connected in communication to said pump chamber is opened in said plunger chamber.

8. The hydraulic cylinder apparatus according to claim 7, wherein:

said hydraulic cylinder is provided with a piston return spring, and a plurality of coned disc springs are installed between said return spring and a piston slidingly contained in said cylinder chamber.

9. The hydraulic cylinder apparatus according to claim 8, wherein:

a pushing means for preloading said coned disc springs is disposed between said piston and said return spring.

* * * * *